United States Patent
Liu et al.

(10) Patent No.: US 9,585,076 B2
(45) Date of Patent: Feb. 28, 2017

(54) ENHANCED SOLUTION FOR HANDOVER

(71) Applicant: Telefonaktiebolaget L M Ericsson (publ), Stockholm (SE)

(72) Inventors: Peng Liu, Beijing (CN); Licong Huang, Beijing (CN); Jing Liu, Beijing (CN); Robert Ma, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/763,987

(22) PCT Filed: Feb. 6, 2013

(86) PCT No.: PCT/CN2013/071423
§ 371 (c)(1),
(2) Date: Jul. 28, 2015

(87) PCT Pub. No.: WO2014/121457
PCT Pub. Date: Aug. 14, 2014

(65) Prior Publication Data
US 2015/0373611 A1 Dec. 24, 2015

(51) Int. Cl.
H04W 36/30 (2009.01)
H04W 36/00 (2009.01)

(52) U.S. Cl.
CPC ....... H04W 36/30 (2013.01); H04W 36/0083 (2013.01)

(58) Field of Classification Search
CPC . H04W 36/0083; H04W 36/30; H04W 16/32; H04L 5/0035
See application file for complete search history.

(56) References Cited

U.S. PATENT DOCUMENTS

2010/0173626 A1   7/2010   Catovic et al.
2010/0246534 A1   9/2010   Vargantwar et al.
2011/0002308 A1   1/2011   Nagasawa et al.
(Continued)

FOREIGN PATENT DOCUMENTS

CN   101637045 A   1/2010
CN   102325353 A   1/2012
(Continued)

OTHER PUBLICATIONS

PCT International Search Report for International application No. PCT/CN2013/071423, Nov. 14, 2013.
(Continued)

Primary Examiner — Nizar Sivji
(74) Attorney, Agent, or Firm — Baker Botts, LLP

(57) ABSTRACT

Method in a wireless device for managing handover from a source cell to a target cell. When a first difference of a first quality measurement of a signal from the target cell minus a first quality measurement of a signal from the source cell is above a first threshold for a first time period, the wireless device sends a report to the source network node and receives a message to handover to the target cell. When a second difference of a second quality measurement of a signal from the target cell minus a second quality measurement of a signal from the source cell is above a second threshold value, for a second time period, the wireless device triggers handover to the target cell. When it is not above the second threshold value, for the second time period, it cancels the handover.

16 Claims, 8 Drawing Sheets

(56) References Cited

U.S. PATENT DOCUMENTS

2011/0096692 A1    4/2011    Liu et al.
2012/0088507 A1    4/2012    Legg et al.
2012/0115463 A1    5/2012    Weng et al.

FOREIGN PATENT DOCUMENTS

CN    102905327 A    1/2013
EP    2528371 A1    11/2012
WO    WO0013430    3/2000

OTHER PUBLICATIONS

Communication from EPO regarding Patent Application No. 13874766.1-1854 dated Aug. 9, 2016.

ENHANCED SOLUTION FOR HANDOVER

PRIORITY

This nonprovisional application is a U.S. National Stage Filing under 35 U.S.C. §371 of International Patent Application Serial No. PCT/CN2013/071423, filed Feb. 6, 2013, and entitled "AN ENHANCED SOLUTION FOR HANDOVER."

TECHNICAL FIELD

Embodiments herein relate to a wireless device and methods therein. In particular, embodiments herein relate to managing handover from a source cell being serviced by a source network node to a target cell.

BACKGROUND

Communication devices such as wireless devices are also known as e.g. User Equipments (UE), mobile terminals, wireless terminals and/or mobile stations. Wireless devices are enabled to communicate wirelessly in a wireless communications system or wireless communication system, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications system.

Wireless devices may further be referred to as mobile telephones, cellular telephones, or laptops with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as wireless device or a server.

The wireless communications system covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the area of radio coverage provided by the base station at a base station site. One base station, situated on the base station site, may serve one or several cells. Further, each base station may support one or several communication technologies. The base stations communicate over the air interface operating on radio frequencies with the wireless devices within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. The 3GPP has undertaken to evolve further the UTRAN and GSM based radio access network technologies.

According to 3GPP GSM EDGE Radio Access Network (GERAN), a wireless device has a multi-slot class, which determines the maximum transfer rate in the uplink and downlink direction. EDGE is an abbreviation for Enhanced Data rates for GSM Evolution. In the end of 4008 the first release, Release 8, of the 3GPP Long Term Evolution (LTE) standard was finalized and later releases have also been finalized.

In the context of this disclosure, the expression Downlink (DL) is used for the transmission path from the base station to the mobile station. The expression Uplink (UL) is used for the transmission path in the opposite direction i.e. from the mobile station to the base station.

In cellular telecommunications, the term handover refers to the process of transferring an ongoing call or data session from one cell serviced by a network node connected to the core network, i.e., from a source cell serviced by a source network node, to another cell serviced a another network node, i.e., to a target cell serviced by a target network node. In a typical wireless communications network, one network node only covers one or more limited geographical area or cell; therefore, handover from a source cell to a target cell becomes a very important feature for the seamless mobility of wireless devices in the entire wireless communications network. The performance of handover also becomes an important factor that affects the user's experience.

As shown schematically in FIG. 1, in current systems, the general handover process comprises three sub-processes:

(1) When a wireless device detects a better cell which fulfills a certain requirement for handover, the wireless device sends a measurement report which comprises target cell information to inform the source network node to trigger handover preparation. Handover requirements include an offset between source cell and target cell and time delay to trigger the measurement report.

(2) When the source network node receives the measurement report, it will coordinate with the target network node which serves the target or neighboring cell, if there is available resource for the wireless device. The source network node will then send an RrcReconfiguration message to the wireless device, which contains information on the target cell so that the wireless device may access the target cell.

(3) When the wireless device receives the RrcReconfiguration message from the source network node, it will start to access to the target cell, and it will then send handover complete to the source network node after radio link setup success in the new, i.e., target, cell.

If the parameters offset and time to trigger (as shown in FIG. 1) are not set properly, handover may happen too early or too late, which will probably result in a handover failure.

In a cell edge, if a target, also referred to as neighboring, cell is using the same frequency band as the source, also referred to as serving, cell, there may be strong intra-frequency interference. This interference may lead to low Signal-to-Noise Ratio (SNR) when a wireless device is on the cell edge during a handover process, and this may in turn lead to handover failure.

Handover failure is a problem which will degrade the user experience. In practice, various handover failures may occur, and these failures may be grouped into four categories:

(1) Too early handover;
(2) Too late handover;
(3) Handover that is not triggered properly; and
(4) Ping-ponging handover.

FIG. 2 illustrates a first example in a practical scenario of a method of the prior art wherein the handover is performed too late. In the Figure, each one of the source network node and the target network node services three cells (A, B and C). A wireless device moves in the path and direction marked by the arrow.

If the mobility of the wireless device is greater than the handover parameter settings allow for, handover may be triggered when the signal strength of the source cell serviced by the source network node is too low. The signal quality may then not be good enough for the wireless device to detect the Radio Resource Control (RRC) Reconfiguration message. This may lead to a Radio Link Failure (RLF) in the source network node and re-establishment of the communication in a different cell than the source, usually in the target cell serviced by the target network node.

The general solution in current systems is to use Self-Optimizing Network (SON) to optimize the parameters related to handover and try to avoid handover failure resulting from too late handover.

This solution can only reduce the possibility of too late handover, and it needs to collect data for a long time, and analyze it repeatedly.

FIG. 3 depicts a second example in a practical scenario of a method of the prior art wherein the handover is performed too early. As in FIG. 2, each one of the source network node and the target network node may service three cells (A, B and C).

Too-early handover may be triggered when a wireless device enters an island of coverage of another cell contained inside the coverage area of the source cell. This is a typical scenario for areas where fragmented cell coverage is inherent to the radio propagation environment, such as dense urban areas.

In this example, the wireless device has contiguous coverage from a cell B, serviced by the source network node, but due to a region of strong coverage from a cell A, serviced by target network node, a handover takes place to the cell A of the target network node. As the wireless device exits this region of coverage, an RLF occurs and the wireless device reconnects to the cell B of the source network node.

According to prior methods using SON, cell A of the target network node analyses the RLF and checks the length of time it carried the call. If cell A of the target network node carried the call for less than a certain period of time, it then concludes that the wireless device should not have been handed over to cell A of the target network node in the first place. The target network node then sends a Handover Report to the source network node and the neighbor relationship from cell B of the source network node to cell A of the target network node is adjusted such that the wireless device does not handover to cell A of the target network node in the first place. This prior art method requires time consuming data collection and analysis.

Currently, there are many ways to try to overcome the above handover problems. These solutions mainly focus on optimization of handover parameters based on feedback information in an RLF and RRC re-establishment from the wireless device and uplink measurement from the source cell. According to the information from the wireless device and the source network node, at least one of of the source network node and the target network node may be able to identify the different scenarios of handover failure, such as too early handover, too late handover and so on. The optimization function will then adjust the corresponding parameters based on these inputs.

US8012/0088507A1 provides a way to identify different handover problems. The approach disclosed in this application provides full information across the handover process for the handover problem identification and parameter adaptation, uplink and downlink measurements before handover trigger and after the handover is complete. Measurements for handover failure and handover success are all included. Based on the input information, the performance of handover identification and parameter adaption is improved.

US8010/0173626A1 provides a method for configuring adaptive handover parameters, time to delay and signal strength offset included. This mitigates the handover failure problems through repeated adjustment of these parameters.

All the above approaches focus on the handover failure identification and parameter optimization. However, these processes require a lot of information input. Moreover, in addition to the fact that the self-optimization process takes a long time, it can only reduce the possibility of handover failures because of too late handover and too early handover, but it cannot avoid it.

SUMMARY

It is therefore an object of embodiments herein to provide an improved way of managing handover of a wireless device from a source cell to a target cell.

According to a first aspect of embodiments herein, the object is achieved by a method in a wireless device for managing handover from a source cell to a target cell. The source cell is serviced by a source network node. The wireless device, the source network node, the source cell, and the target cell are comprised in a wireless communications network. When a first difference of a first quality measurement of a downlink, DL, signal from the target cell minus a first quality measurement of a DL signal from the source cell is above a first threshold value for a first time period, the wireless device sends a measurement report to the source network node. The measurement report indicates the first difference. The wireless device receives a message from the source network node to handover to the target cell. When a second difference of a second quality measurement of a DL signal from the target cell minus a second quality measurement of a DL signal from the source cell is above a second threshold value, for a second time period, the wireless device triggers the handover to the target cell. When the 10 second difference of the second quality measurement of the DL signal from the target cell minus the second quality measurement of the DL signal from the source cell is not above the second threshold value, for the second time period, the wireless device cancels the handover from the source cell to the target cell.

According to a second aspect of embodiments herein, the object is achieved by a wireless device for managing handover from a source cell to a target cell. The source cell is adapted to be serviced by a source network node. The wireless device, the source network node, the source cell, and the target cell are adapted to be comprised in a wireless communications network. The wireless device comprises a sending circuit configured to send a measurement report to the source network node when a first difference of a first quality measurement of a DL signal from the target cell minus a first quality measurement of a DL signal from the source cell is above a first threshold value for a first time period. The measurement report indicates the first difference. The wireless device also comprises a receiving circuit configured to receive a message from the source network node to handover to the target cell. In addition, the wireless device comprises a triggering circuit configured to trigger the handover to the target cell when a second difference of a second quality measurement of a DL signal from the target cell minus a second quality measurement of a DL signal from the source cell is above a second threshold value, for a second time period. The wireless device also comprises a cancelling circuit configured to cancel the handover from the source cell to the target cell when the second difference of the second quality measurement of the DL signal from the target cell minus the second quality measurement of the DL signal from the source cell is not above the second threshold value, for the second time period.

By having two independent criteria to trigger the measurement report and the actual handover to the target cell, the two criteria may be flexibly configured. The first criterion may be set to avoid too late handover and the second criterion may be set to avoid too early handover, therefore avoiding an RLF.

A particular advantage of the embodiments herein is that a wireless device, such as a user equipment, may receive an RrcReconfiguration message from a source network node in advance during a handover process, thus avoiding too late handover and an RLF.

Another particular advantage of the embodiments herein is that by triggering the handover only when a second quality measurement of a DL signal from the target cell minus a second quality measurement of a DL signal from the source cell is above a second threshold value, for a second time period, too early handover, and thus, an RLF, is avoided. The claimed method may postpone the access to the new cell while holding the link with old cell, so that it may avoid too late handover and too early handover, if the parameters are set properly.

A yet further advantage of embodiments herein is that the claimed method may not need a long time to collect and analyze handover data, in comparison with, for example, the existing SON solution. That is, the claimed method is more efficient and effective compared with the SON solution. This is particularly relevant for embodiments in which the wireless device may be moving at high speed because the handover parameters are difficult to manage in a high speed scenario, and the possibility of too late handover is high using traditional solutions.

BRIEF DESCRIPTION OF THE DRAWINGS

Examples of embodiments herein are described in more detail with reference to attached drawings in which.

DETAILED DESCRIPTION

Figure 4:
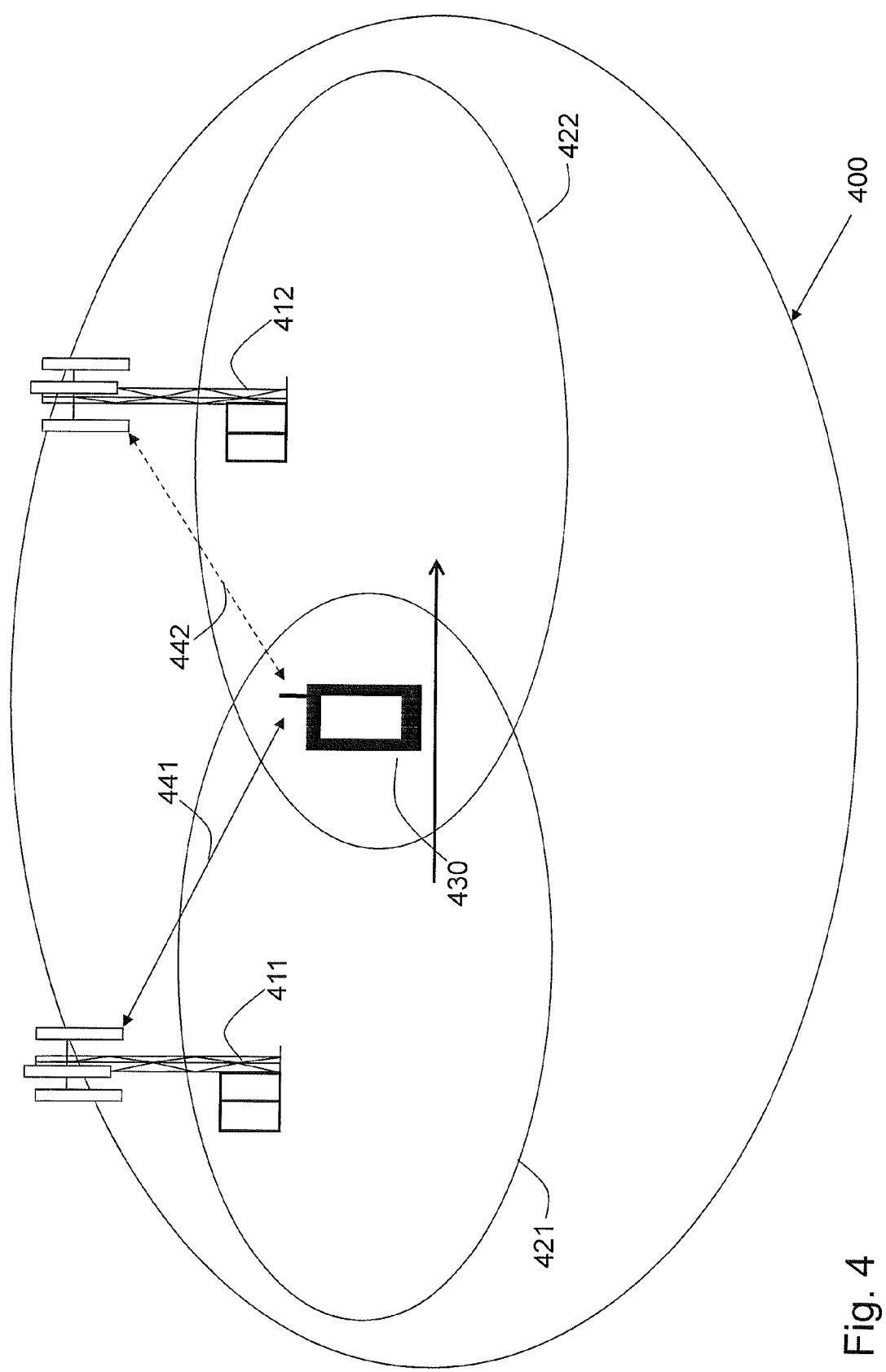
FIG. 4 is a schematic block diagram illustrating a wireless communications network.

FIG. 4 depicts a wireless communications network 400 in which embodiments herein may be implemented. The wireless communications network 400 may for example be a network such as a Long-Term Evolution (LTE), e.g. LTE Frequency Division Duplex (FDD), LTE Time Division Duplex (TDD), LTE Half-Duplex Frequency Division Duplex (HD-FDD), Wideband Code Division Multiple Access (WCDMA), Universal Terrestrial Radio Access (UTRA) TDD, Global System for Mobile communications (GSM) network, GSM/Enhanced Data Rate for GSM Evolution (EDGE) Radio Access Network (GERAN) network, EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Worldwide Interoperability for Microwave Access (Wimax), or any cellular network or system.

The wireless communications network 400 comprises a source network node 411 and a target network node 412. Each of the source network node 411 and target network node 412 may be a base station such as e.g. an eNB, eNodeB, or a Home Node B, a Home eNode B, femto Base Station, BS, pico BS or any other network unit capable to serve a device or a machine type communication device in a wireless communications network 400. In some particular embodiments, source network node 411 or target network node 412 may be a stationary relay node or a mobile relay node. The mixed wireless network 400 covers a geographical area which is divided into cell areas, wherein each cell area is served by a network node, although, one network node may serve one or several cells. In the example depicted in FIG. 4, the source network node 411 serves a source cell 421, and the target network node 412 serves a target cell 222. Each of the source network node 411 and target network node 412 may be of different classes such as e.g. macro eNodeB, home eNodeB or pico base station, based on transmission power and thereby also cell size. Typically, wireless communications network 400 may comprise more cells similar to 421 and 422, served by their respective network nodes. This is not depicted in FIG. 4 for the sake of simplicity. Each of the source network node 411 and target network node 412 may support one or several communication technologies, and its name may depend on the technology and terminology used. In 3GPP LTE network nodes, which may be referred to as eNodeBs or even eNBs, may be directly connected to one or more core networks.

A number of wireless devices are located in the wireless communications network 400. In the example scenario of FIG. 4, only one wireless device is shown, wireless device 430. The wireless device 430 may e.g. communicate with the source network node 411 over a radio link 441 and communicate with the target network node 412 over a radio link 442. The wireless device 430 may move in the path and direction marked by the arrow.

The wireless device 430 is a wireless communication device such as a UE which is also known as e.g. mobile terminal, wireless terminal and/or mobile station. The device is wireless, i.e., it is enabled to communicate wirelessly in a wireless communication network, sometimes also referred to as a cellular radio system or cellular network. The communication may be performed e.g., between two devices, between a device and a regular telephone and/or between a device and a server. The communication may be performed e.g., via a RAN and possibly one or more core networks, comprised within the wireless network.

The wireless device 430 may further be referred to as a mobile telephone, cellular telephone, or laptop with wireless capability, just to mention some further examples. The device 430 in the present context may be, for example, portable, pocket-storable, hand-held, computer-comprised, or vehicle-mounted mobile devices, enabled to communicate voice and/or data, via the RAN, with another entity, such as a server, a laptop, a Personal Digital Assistant (PDA), or a tablet computer, sometimes referred to as a surf plate with wireless capability, Machine-to-Machine (M2M) devices, devices equipped with a wireless interface, such as a printer or a file storage device or any other radio network unit capable of communicating over a radio link in a cellular communications system.

Figure 1:
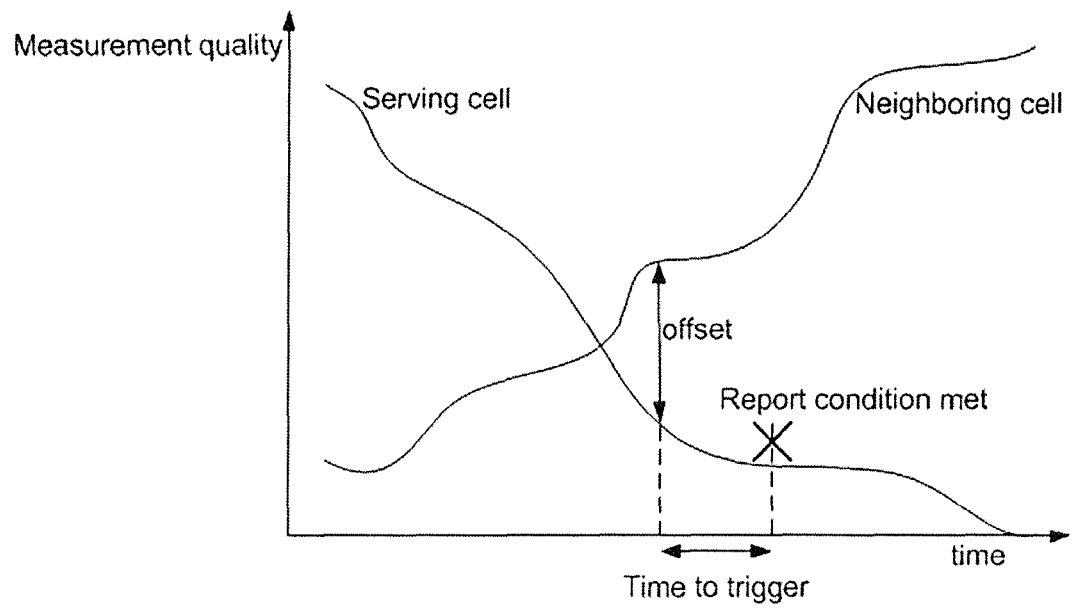
FIG. 1 is a schematic diagram depicting a prior art handover method.
Figure 5:
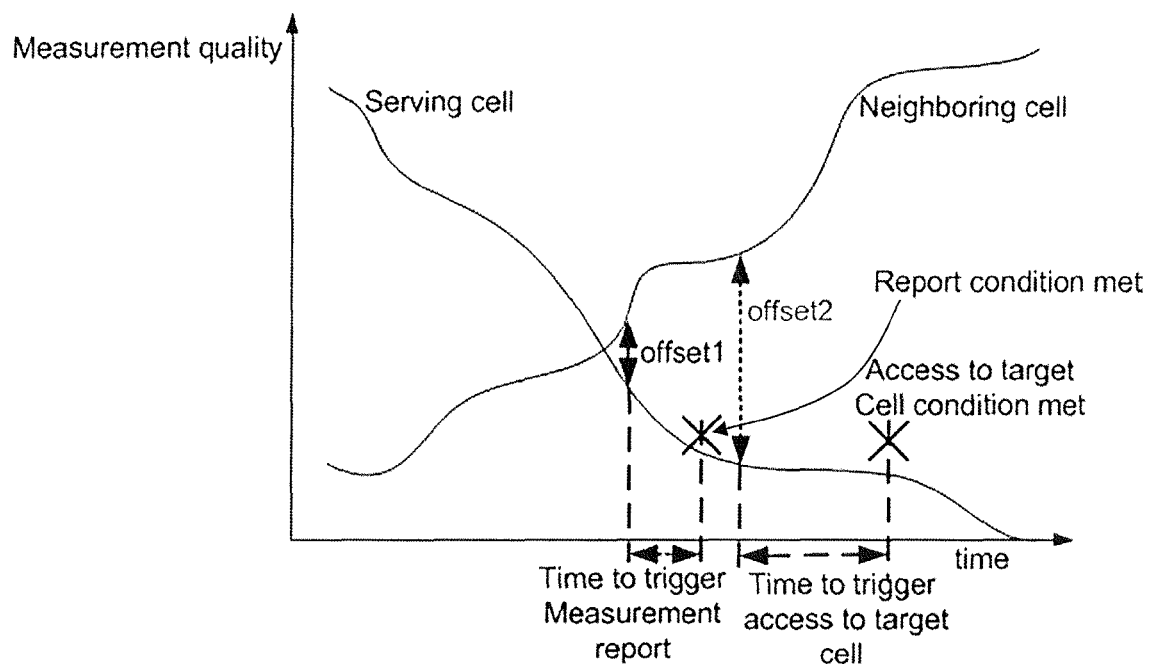
FIG. 5 is a schematic diagram illustrating embodiments of a method in a wireless device.

As mentioned above, if the parameters offset and time to trigger (as shown in FIG. 1) are not set properly, handover may happen too early or too late, which will probably result in a handover failure. A way to avoid duplicating signalling according to embodiments herein, as shown in FIG. 5, may be to break down the two handover parameters, offset and time to trigger, and split every parameter into two parts. The first part may be used as the threshold for triggering the measurement report. The second part may be used to trigger the start of the access to the target cell 412 when the wireless device 430 has received the RrcReconfiguration message from the source network node 411, as shown in FIG. 5. For example, this means that when the wireless device 430 receives the RrcReconfiguration message from the source network node 411, it will not start to access the target cell 422 immediately, as done in the prior art. Instead, it will hold on to the source cell 421 and check if the signal quality from the target cell 422 meets the requirement to start access to the target cell 422. If so, the handover process will continue. The wireless device 430 starts to access the target cell 422. If not, the wireless device 430 cancels the handover. In the example shown in this Figure, the wireless device 430 cancels the handover by sending a handover cancel message to the source network node 411 to stop this handover when a timer has timed out.

According to embodiments herein, two different criteria are utilized during the handover process.

Criterion 1:

A first offset value, referred to as Offset1, is a first threshold of the difference of a quality measurement of a DL signal from the target cell 422 minus a quality measurement of a DL signal from the source cell 421 at a first time point, that is, a first difference. This first threshold may be configured by a network operator during an optimization process, and establishes that the DL signal quality of the target cell 422 is better than that of the source cell 421, according to a set of requirements determined by the operator according to a live network scenario. A first time period, referred to as time to trigger, is the first time period during which this first threshold is met, and which triggers that a measurement report is sent to the source network node 411. This first time period may be also configured by the network operator during the optimization process.

Criterion 2:

A second offset value, referred to as Offset2, is a second threshold of the difference of a quality measurement of a DL signal from the target cell 422 minus a quality measurement of a DL signal from the source cell 421 at a second time point, that is, a second difference. This second threshold may be configured by the network operator during an optimization process, and establishes that the DL signal quality of the target cell 422 is better than that of the source cell 421, according to a set of requirements determined by the operator according to a live network scenario. A second time period or time to trigger, is the second time period during which this second threshold is met, and which triggers access to the target cell 422. This second time period may be also configured by the network operator during the optimization process.

Criterion 1 may be used to trigger the measurement report to the source network node 411 and criterion 2 may be used to trigger the access into the target cell 422. The second threshold may be the same or bigger than the first threshold.

In general terms, the embodiments herein of a method for managing handover from a source cell 421 to a target cell 422 may comprise the following processes:

When the wireless device 430 detects a new neighbor or target cell 422, which is serviced by a neighbor or target network node 412, and the DL quality measurements meet criterion 1, the wireless device 430 sends a measurement report to the serving or source network node 411.

The source network node 411 may then negotiate with the target network node 412 preparation for handover.

If the negotiation with the target network node 412 succeeds, the source network node 411 may then send an RrcReconfiguration message to the wireless device 430.

When the wireless device 430 receives the RrcReconfiguration message, it may check the DL signal quality again. If the signal quality of the target cell 422 is better than the second threshold, i.e., offset2, it may move on to the next step. If not, the wireless device 430 may send a "handover cancel" message to the source network node 411 to terminate the handover process.

If the signal quality of the target cell 422 in the previous step has been better than the second threshold, the wireless device 430 may then check how long the signal quality meets criterion 2. If it lasts longer than an established second time period, the wireless device 430 may start to access to target cell 422. If not, the wireless device 430 may send a "handover cancel" message to the source cell 421 to terminate the handover process when the second time period is timed out.

The embodiments herein, allow avoidance of an RLF due to too early and too late handover, as will now be illustrated in a too early handover example and a too late handover examples, in comparison with the prior art method.

Figure 6:
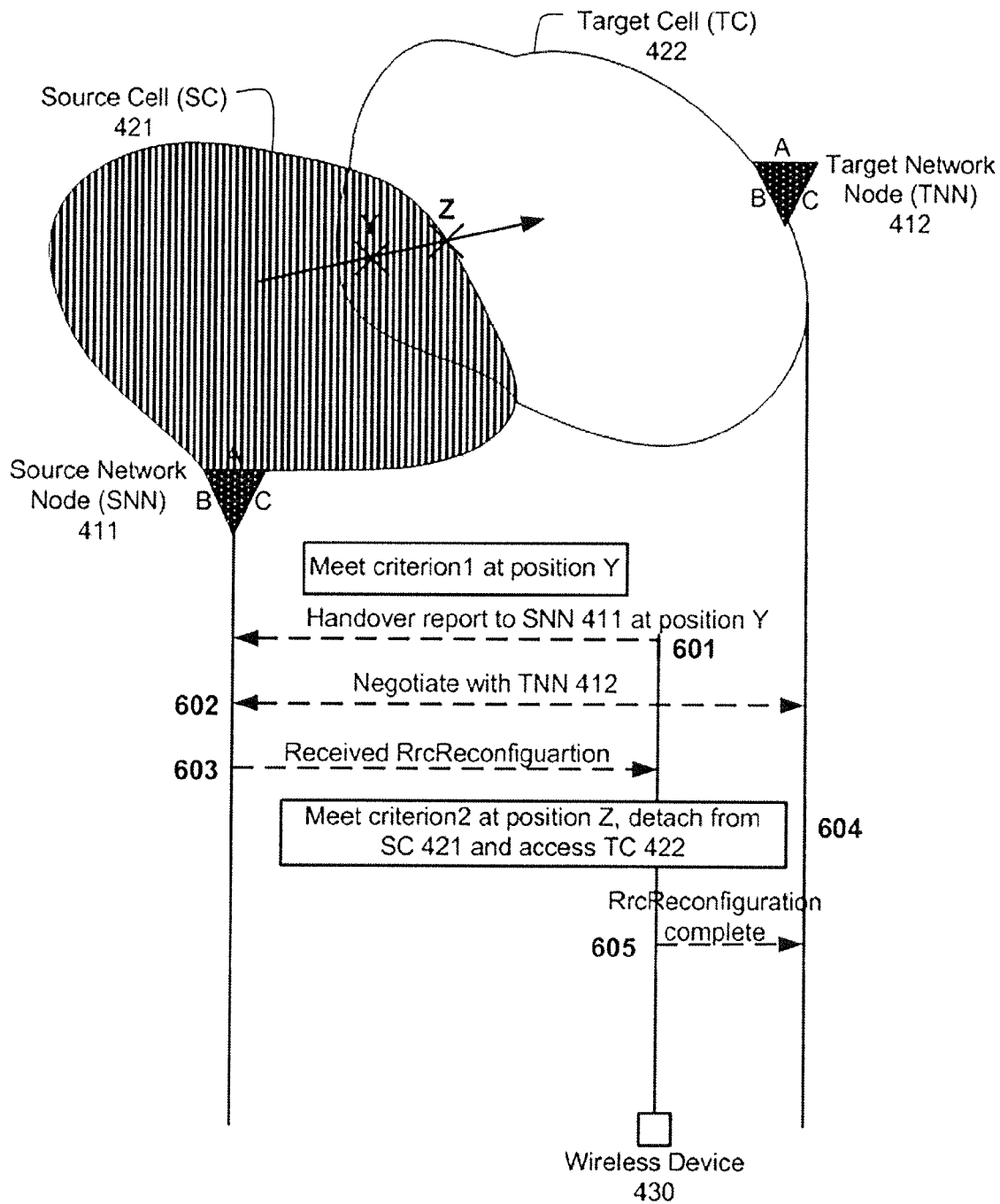
FIG. 6 is a schematic diagram illustrating embodiments of a method in a wireless device.

FIG. 6 depicts an example of how a handover may be handled according to embodiments herein.

In this example, the handover parameters are broken down into criterion 1 and criterion 2, as described above. Criterion 1 is used to trigger the measurement report to the source network node 411, and criterion 2 is used to trigger access to the target cell 422 after the wireless device 430 has received the RrcReconfiguration message from the source network node 411 in the manner summarized below. Also, in this example, each of the source network node 411 and target network node 412 has three cells (A, B and C), although only one cell in each node is represented in the Figure, to illustrate the explanation. In this example, the wireless device 430 moves in the path and direction marked by the arrow.

(601) If the signal quality meets criterion 1 at point Y, the wireless device 430 may send a measurement report to the source network node 411.

(602) When source network node 411 receives the measurement report from the wireless device 430, it may negotiate with the target network node 412 the resource allocation and access control.

(603) The source network node 411 may send an RrcReconfiguration message to the wireless device 430. The wireless device 430 may then check the DL signal quality again to see if it meets the second threshold. During this process, the wireless device 430 may hold the old link with the source cell 421 and wait for a new access to the target cell 422.

(604) At point Z, the DL signal quality of the target cell 422 is good enough to meet criterion 2. That is, to meet offset2 for the second time period, so the wireless device 430 starts to access the target cell 422.

(605) The wireless device 430 may then send an RrcReconfiguration Complete to the target network node 412 after synchronizing with it.

Figure 2:
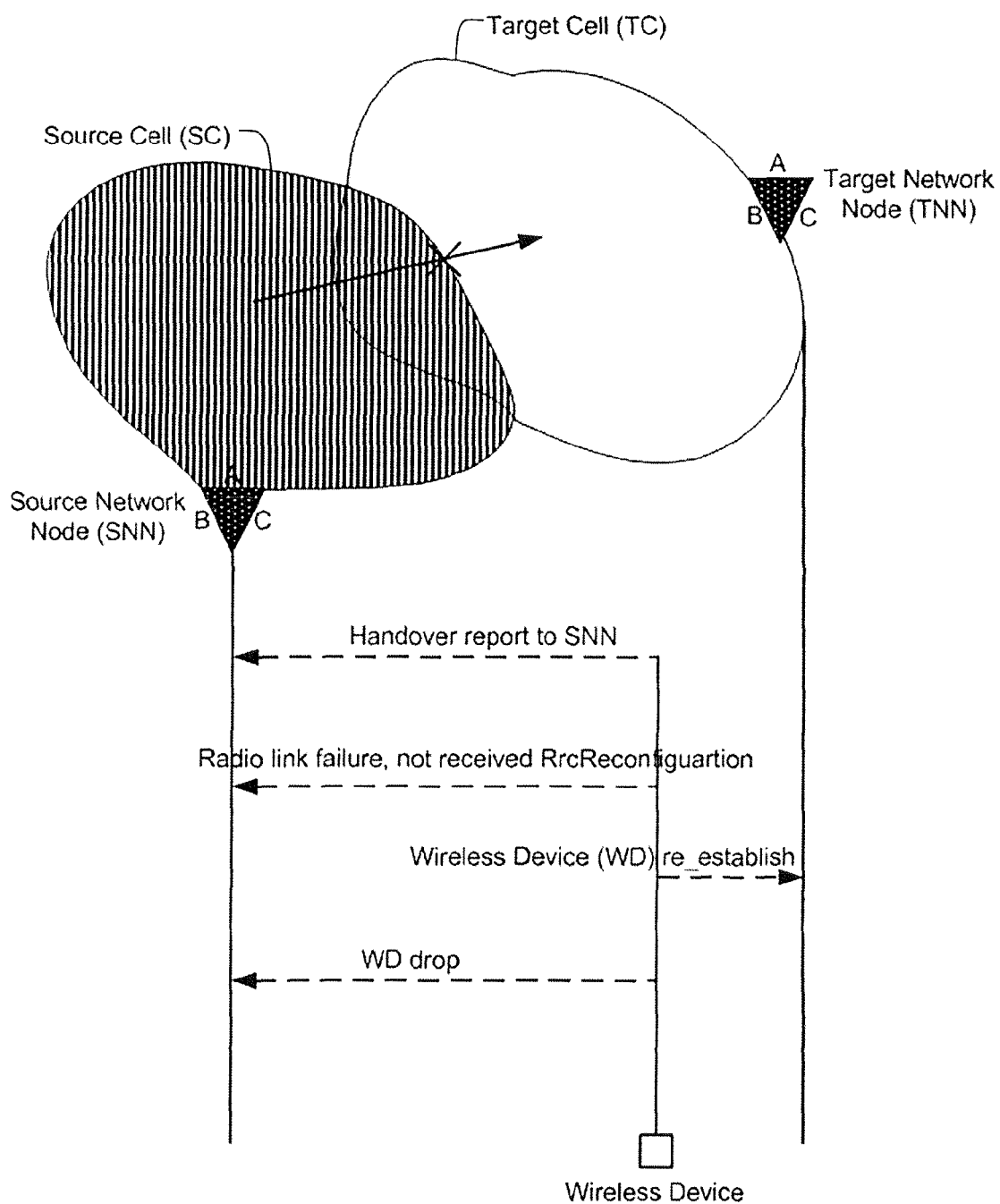
FIG. 2 is a schematic diagram depicting a prior art handover method.

By using embodiments herein, the wireless device 430 may receive the RrcReconfiguration message in advance, avoiding the consequences of too late handover, in instances such as those of the example shown in FIG. 2. That is, when the wireless device 430 may not receive the RrcReconfiguration message if it is moving at high speed.

Figure 7:
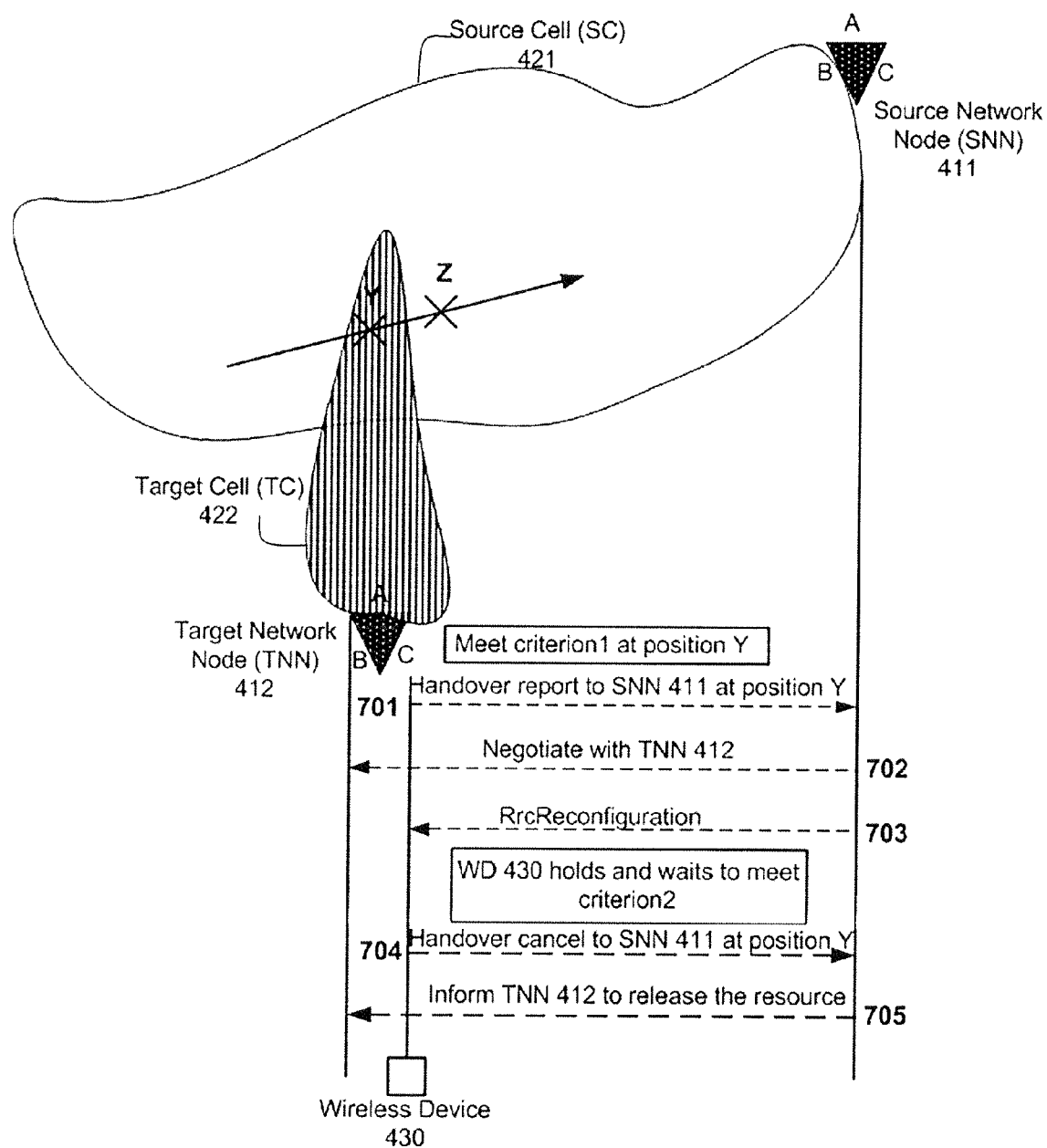
FIG. 7 is a schematic diagram illustrating embodiments of a method in a wireless device.

FIG. 7 depicts how the example of FIG. 2 may be handled according to embodiments of the claimed method.

(701) When the signal quality meets criterion 1 at point Y, the wireless device 430 sends a measurement report to the source network node 411.

(702) When the source network node 411 receives the measurement report from the wireless device 430, it negotiates with the target network node 412 resource allocation and access control.

(703) The source network node 411 may send an RrcReconfiguration message to the wireless device 430. The wireless device 430 may then check the DL signal quality again. If it meets criterion 2, the wireless device 430 starts access to the target cell 422. If not, the wireless device 430 may hold the old link with the source cell 421 and wait for new access to the target cell 422.

(704) At point Z, the downlink signal quality of the target cell 422 may not be good enough to meet criterion 2 because the wireless device 430 has been out of the coverage of the target cell 422, so the wireless device 430 may send a "handover cancel" message to the source network node 411.

Figure 3:
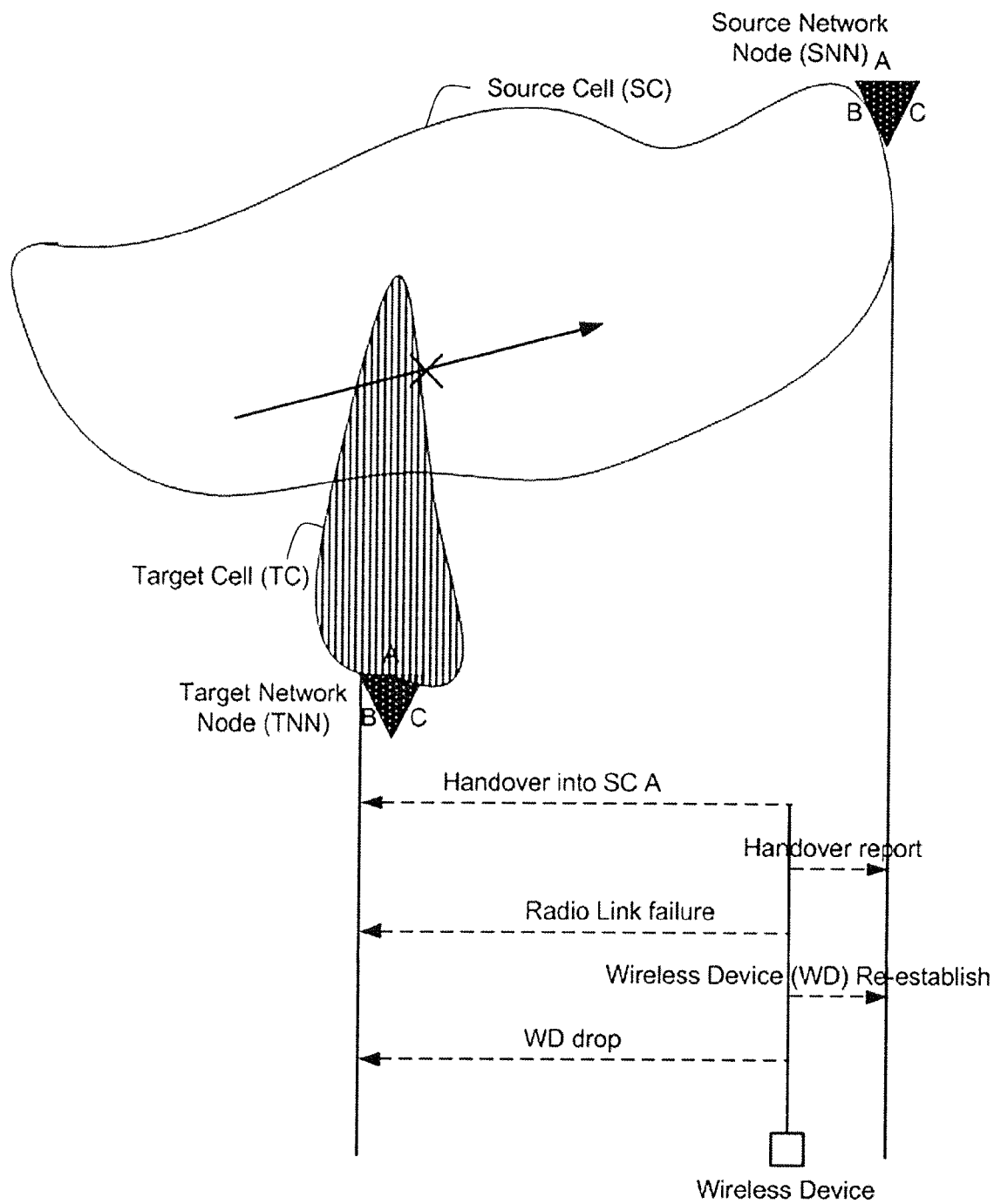
FIG. 3 is a schematic diagram depicting a prior art handover method.

(705) The source network node 411 may then inform the target network node 412 to release the resource prepared for handover. This handover process may then be terminated and the handover failure result from too early handover, as described in relation to FIG. 3, may be avoided.

In the description of embodiments herein that follows in relation to a method and a wireless device, one or more of the actions described as being performed by a cell may be understood to be performed by the network node serving it, and vice versa.

In accordance with the foregoing, the embodiments herein aim to provide an improved method for managing handover from a source cell 421 to a target cell 422, which avoids too early and too late handover issues.

Figure 8:
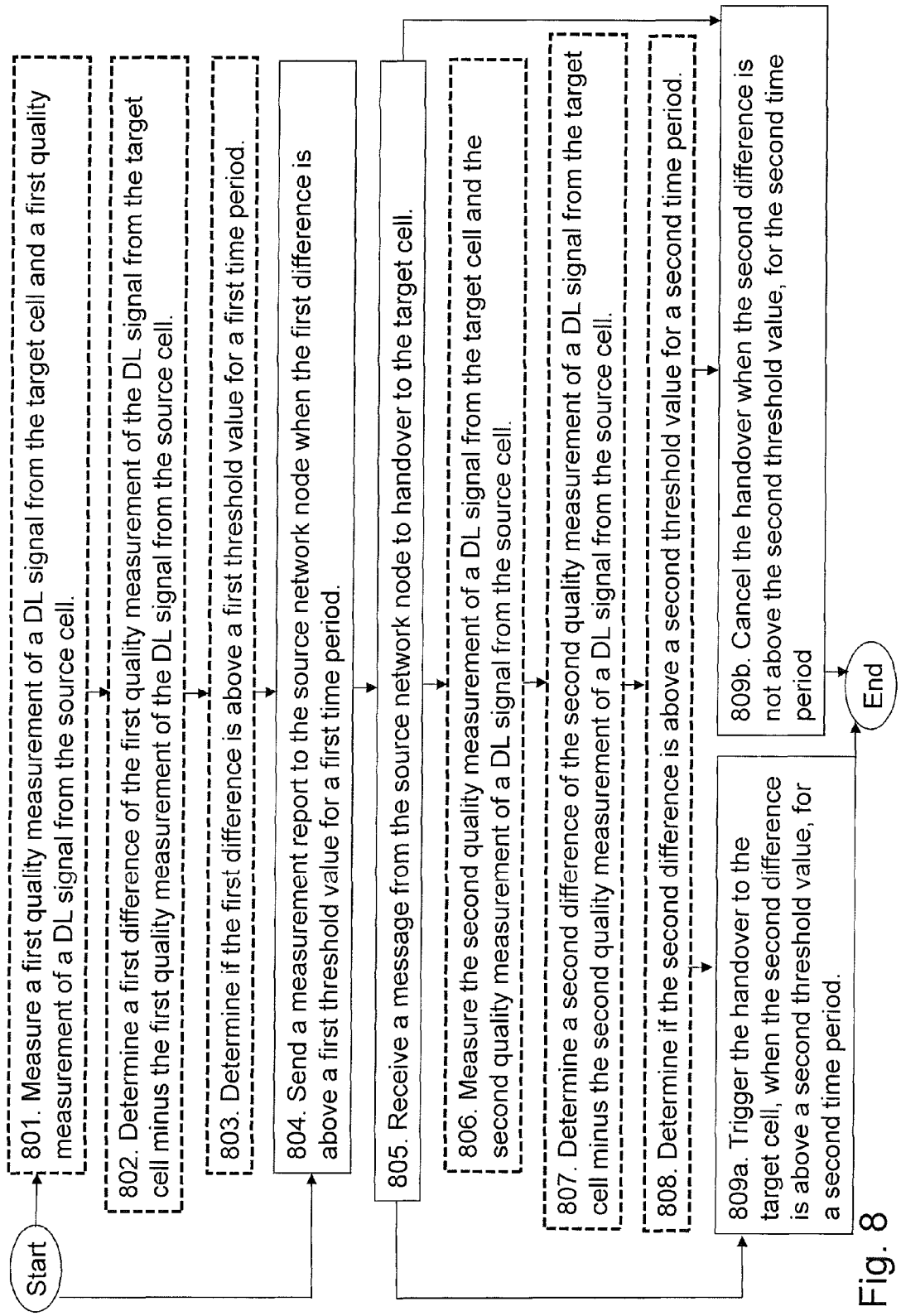
FIG. 8 is a flowchart depicting embodiments of a method in a wireless device.

Example of embodiments of a method in a wireless device 430 for managing handover from a source cell 421 to a target cell 422, will now be described with reference to a flowchart depicted in FIG. 8. The source cell 421 is serviced by a source network node 411, and the wireless device 430, the source network node 411, the source cell 421, and the target cell 422 are comprised in a wireless communications network 400. The method comprises the following actions, which actions may be taken in any suitable order. Dashed lines of some boxes in FIG. 8 indicate that the action is not mandatory.

Action 801

To assess if a handover from the source cell 421 to the target cell 422 may be necessary in order to avoid an RLF, the wireless device 430 may measure a first quality measurement of a downlink, DL, signal from the target cell 422 and a first quality measurement of a DL signal from the source cell 421. In some of these embodiments, the quality measurement of a DL signal may be a Reference Signal Received Power (RSRP) measurement. In other embodiments, the quality measurement of a DL signal may be a Received Signal Code Power (RSCP), such as in embodiments where the wireless communications network 400 comprises a WCDMA.

The measurement may be performed by measuring a DL reference signal, regardless of whether it is in idle mode or connection mode. This is an optional action.

Action 802

This is an optional action. The wireless device 430 may continue assessing if a handover from the source cell 421 to the target cell 422 may be necessary in order to avoid an RLF by determining a first difference of the first quality measurement of the DL signal from the target cell 422 minus the first quality measurement of the DL signal from the source cell 421.

Action 803

In some embodiments, the wireless device 430 may need to determine if the signal quality from the target cell 422 is sufficiently better than that of the source cell 421 to justify a handover to the target cell 422. This may be done by comparing the difference between the signals of the two cells 421, 422, with a certain value or threshold, such as a first threshold.

In addition, the wireless device 430 may need to determine if the signal quality from the target cell 422 is sufficiently better than that of the source cell 421 for a sufficiently long amount of time, i.e., for a first time period. This may be performed in order to avoid unnecessary handover such as in the cases, for example, of short-lived deteriorations of the signal quality from the source cell 421, due to mere fluctuations in the quality level of the signal received.

In some embodiments, the value of the first threshold and the first time period may be configured by the operator of the wireless communications network 400 according to the experience acquired during the wireless communications network 400 optimization process. In some particular embodiments, the first threshold may be configured by the operator of the wireless communications network 400 on the source network node 411. The source network node 411 may then send the configured first threshold to the wireless device 430 via a message, such as for example an RRC message, when the wireless device 430 registers with the source cell 421. In some particular embodiments, the first threshold may be set so that too late handover is avoided. In some further particular embodiments, this may mean that the first threshold, e.g., offset1 in FIG. 5, may be set to be smaller than the offset currently used in prior art systems.

Thus, in some embodiments, the wireless device 430 may determine if a first difference of a first quality measurement of the DL signal from the target cell 422 minus the first quality measurement of a DL signal from the source cell 421 may be above a first threshold value for a first time period. This is an optional action.

Action 804

When the first difference of a first quality measurement of the DL signal from the target cell 422 minus a first quality measurement of a DL signal from the source cell 421 is above the first threshold value for a first time period, the wireless device 430 will send a measurement report to the source network node 411, wherein the measurement report indicates the first difference.

In some embodiments, the measurement report may be an RRC message. In some particular embodiments, the measurement report may identify the target cell 422.

Action 805

Once the source network node 411 receives the measurement report from the wireless device 430, which may contain the identity of the target cell 422, the source network node 411 may evaluate the live situation of the target cell 422, e.g., if it is overloaded or not, as known in the art, for example, through "Access control" and "load balancing" subsystems in an LTE wireless communications network. If the live situation of the target cell 422 is optimal for handover, e.g., if there is no overload, a target network node 412, which may service the target cell 422, and which may be comprised in the wireless communications network 400, may do the handover preparation, i.e., setup the resources for the wireless device 430, which may want to handover to the target cell 422. Then, in some embodiments, and in response to the measurement report sent to the source network node 411, the wireless device 430 may receive a message from the source network node 411 to handover to the target cell 422.

In some embodiments, the message received may be a Radio Resource Control (RRC) Reconfiguration message. In other embodiments, the message received may be a handover command, e.g., in a GSM network.

Action 806

In some embodiments, and after receiving the message from the source network node 411 to handover to the target cell 422, the wireless device 430 may measure a second quality measurement of a DL signal from the target cell 422 and a second quality measurement of a DL signal from the source cell 421. This optional action may be performed in a similar way as described in action 801, but at a later time point.

Action 807

In some embodiments, the wireless device 430 may determine a second difference of the second quality measurement of a DL signal from the target cell 422 minus the 15 second quality measurement of a DL signal from the source cell 421. This optional action may be performed in a similar way as described in action 802, but at a later time point.

Action 808

In some embodiments, the wireless device 430 may need to determine if the signal quality from the target cell 422 continues to be sufficiently better than that of the source cell 422 to still justify a handover to the target cell 422. This may be done by comparing the difference between the signals of the two cells 421, 422, with a certain value or threshold, such as a second threshold.

In addition, the wireless device 430 may need to determine if the signal quality from the target cell 422 is sufficiently better than that of the source cell 421 for a sufficiently long amount of time, i.e., for a second period. This may be performed in order to avoid triggering handover for short-lived deteriorations of the signal quality from the source cell 421, due to mere fluctuations in the quality level of the signal received.

In some embodiments, the value of the threshold and the second time period may be configured by the operator of the wireless communications network 400 according to the experience acquired during the wireless communications network 400 optimization process. In some particular embodiments, the second threshold may be set so that too early handover is avoided. In some further particular embodiments, this may mean that the second threshold (offset2 in FIG. 5) is set to be larger than the offset currently used in prior art systems. Moreover, in some particular embodiments, the second threshold value may be higher than the first threshold value, to indicate if the quality of the signal from the source cell 421 continues to deteriorate with respect to the quality of the signal from the target cell 422.

In some embodiments, the wireless device 430 may determine if the second difference of the second quality measurement of the DL signal from the target cell 422 minus the second quality measurement of the DL signal from the source cell 421 may be above a second threshold value. This optional action may be performed in a similar way as described in action 803.

Action 809a

When the second difference of the second quality measurement of a DL signal from the target cell 422 minus the second quality measurement of a DL signal from the source cell 421 is above the second threshold value, for a second time period, the wireless device 430 will trigger the handover to the target cell 422.

Action 809b

When the second difference of the second quality measurement of the DL signal from the target cell 422 minus the second quality measurement of the DL signal from the source cell 421 is not above the second threshold value, for the second time period, the wireless device 430 will cancel the handover from the source cell 421 to the target cell 422.

In some embodiments, the wireless device 430 may cancel by sending a message to the source network node 411 comprising a request to cancel the handover from the source cell 421 to the target cell 422.

In some embodiments, the wireless device 430 may cancel by determining to cancel the handover from the source cell 421 to the target cell 422.

This handover process may then be terminated. The target network node 412 may then release the radio resources which may have been setup for the handover. Thus, the handover failure result from too early handover, may be avoided.

Figure 9:
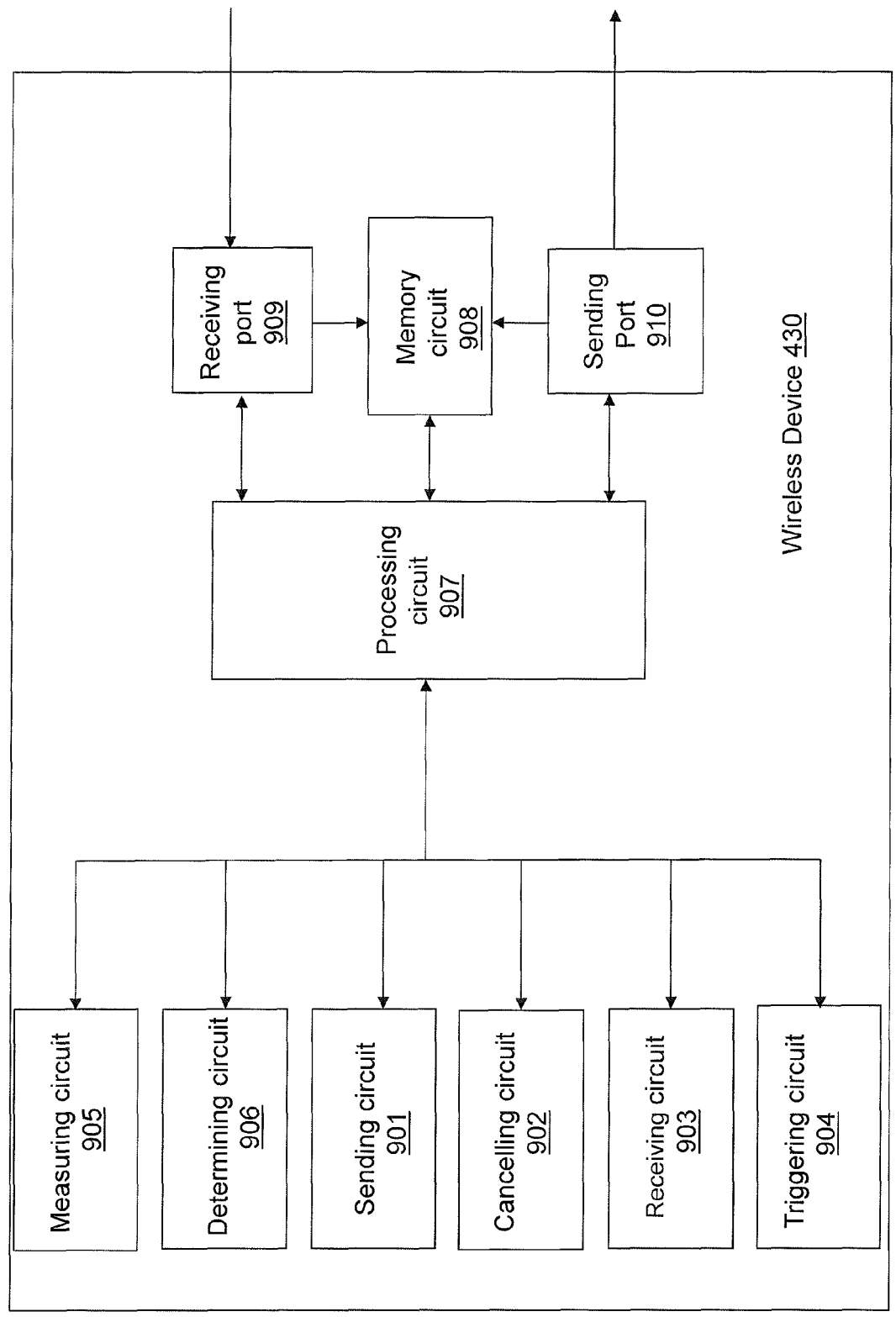
FIG. 9 is a schematic block diagram illustrating a wireless device.

To perform the method actions in the wireless device 430 described above in relation to FIGS. 4-8 for managing handover from a source cell 421 to a target cell 422, the wireless device 430 comprises the following arrangement depicted in FIG. 9. As mentioned above, the source cell 421 is adapted to be serviced by a source network node 411, and the wireless device 430, the source network node 411, the source cell 421, and the target cell 422 are adapted to be comprised in a wireless communications network 400.

The wireless device 430 comprises a sending circuit 901 configured to send a measurement report to the source network node 411 when a first difference of a first quality measurement of a downlink, DL, signal from the target cell 422 minus a first quality measurement of a DL signal from the source cell 421 is above a first threshold value for a first time period, wherein the measurement report indicates the first difference.

The wireless device 430 also comprises a cancelling circuit 902 configured to cancel the handover from the source cell 421 to the target cell 422 when the second difference of the second quality measurement of the DL signal from the target cell 422 minus the second quality measurement of the DL signal from the source cell 421 is not above the second threshold value, for the second time period.

The wireless device 430 also comprises a receiving circuit 903 configured to receive a message from the source network node 411 to handover to the target cell 422.

In addition, the wireless device 430 also comprises a triggering circuit 904 configured to trigger the handover to the target cell 422 when a second difference of a second quality measurement of a DL signal from the target cell 422 minus a second quality measurement of a DL signal from the source cell 421 is above a second threshold value, for a second time period.

In some embodiments, the second threshold value may be higher than the first threshold value.

In some embodiments, the message received may be an RrcReconfiguration message.

In some embodiments, the quality measurement of a DL signal may be an RSRP measurement.

In some embodiments, the wireless device 430 may further comprise a measuring circuit 905 configured to measure the first quality measurement of a DL signal from the target cell 422 and the first quality measurement of a DL signal from the source cell 421.

In some embodiments, the measuring circuit 905 may further be configured to measure the second quality measurement of a DL signal from the target cell 422 and the second quality measurement of a DL signal from the source cell 421.

In some embodiments, the wireless device 430 may further comprise a determining circuit 906 configured to determine the first difference.

In some embodiments, the determining circuit 906 may be further be configured to determine the second difference.

The embodiments herein for managing handover from a source cell 421 to a target cell 422 may be implemented through one or more processors, such as a processing circuit 907 in the wireless device 430 depicted in FIG. 9, together with computer program code for performing the functions and actions of the embodiments herein. The program code mentioned above may also be provided as a computer program product, for instance in the form of a data carrier carrying computer program code for performing the embodiments herein when being loaded into the in the wireless device 430. One such carrier may be in the form of a CD ROM disc. It may be however feasible with other data carriers such as a memory stick. The computer program code may furthermore be provided as pure program code on a server and downloaded to the wireless device 430.

The wireless device 430 may further comprise a memory circuit 908 comprising one or more memory units. The memory circuit 908 may be arranged to be used to store data such as, the information received or measured by the processing circuit 907 in relation to obtaining the device location and/or interference, and applications to perform the methods herein when being executed in the wireless device 430. Memory circuit 908 may be in communication with the processing circuit 907. Any of the other information processed by the processing circuit 907 may also be stored in the memory circuit 908.

In some embodiments, information regarding the quality of a DL signal from the target cell 422, and the quality of a DL signal from the source cell 421, and the message from the source network node 411 to handover to the target cell 422 may be received through a receiving port 909. In some embodiments, the receiving port 909 may be, for example, connected to one or more antennas in the wireless device 430. In other embodiments, the receiving port 909 may receive information from another structure in the wireless communications network 400 through the receiving port 909. Since the receiving port 909 may be in communication with the processing circuit 907, the receiving port 909 may then send the received information to the processing circuit 907. The receiving port 909 may also be configured to receive other information.

The information received or measured by the processing circuit 907 in relation to, for example, the quality of a DL signal from the source cell 421, quality of a DL signal from the target cell 422, and the message from the source network node 411 to handover to the target cell 422, may be stored in the memory circuit 908 which, as stated earlier, may be in communication with the processing circuit 907 and the receiving port 909.

The processing circuit 907 may be further configured to send information, such as the measurement report, to the source network node 411, through a sending port 910, which may be in communication with the processing circuit 907, and the memory circuit 908

Those skilled in the art will also appreciate that the measuring circuit 905, the determining circuit 906, the sending circuit 901, the receiving circuit 903 and the triggering circuit 904 described above may refer to a combination of analog and digital circuits, and/or one or more processors configured with software and/or firmware (e.g., stored in memory) that, when executed by the one or more processors such as the processing circuit 907, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a wireless device for managing handover from a source cell to a target cell, the source cell being serviced by a source network node, and the wireless device, the source network node, the source cell, and the target cell being comprised in a wireless communications network, the method comprising:
   when a first difference of a first quality measurement of a downlink, DL, signal from the target cell minus a first quality measurement of a DL signal from the source cell is above a first threshold value for a first time period, sending a measurement report to the source network node, wherein the measurement report indicates the first difference, receiving a message from the source network node to handover to the target cell, when a second difference of a second quality measurement of a DL signal from the target cell minus a second quality measurement of a DL signal from the source cell is above a second threshold value, for a second time period, triggering the handover to the target cell, and when the second difference of the second quality measurement of the DL signal from the target cell minus the second quality measurement of the DL signal from the source cell is not above the second threshold value, for the second time period, cancelling the handover from the source cell to the target cell.

2. The method of claim 1, wherein the second threshold value is higher than the first threshold value.

3. The method of claim 1, wherein the message received is an RrcReconfiguration message.

4. The method of claim 1, wherein the quality measurement of a DL signal is an RSRP measurement.

5. The method of claim 1, further comprising measuring the first quality measurement of a DL signal from the target cell and the first quality measurement of a DL signal from the source cell.

6. The method of claim 1, further comprising determining the first difference.

7. The method of claim 1, further comprising measuring the second quality measurement of a DL signal from the target cell and the second quality measurement of a DL signal from the source cell.

8. The method of claim 1, further comprising determining the second difference.

9. A wireless device for managing handover from a source cell, the source cell being adapted to be serviced by a source network node, and the wireless device, the source network node, the source cell, and the target cell being adapted to be comprised in a wireless communications network, the wireless device comprising:

an interface configured to send a measurement report to the source network node when a first difference of a first quality measurement of a downlink, DL, signal from the target cell-minus a first quality measurement of a DL signal from the source cell is above a first threshold value for a first time period, and wherein the measurement report indicates the first difference;

one or more processors configured to cancel the handover from the source cell to the target cell when the second difference of the second quality measurement of the DL signal from the target cell minus the second quality measurement of the DL signal from the source cell is not above the second threshold value, for the second time period;

the interface further configured to receive a message from the source network node to handover to the target cell, and the one or more processors further configured to trigger the handover to the target cell when a second difference of a second quality measurement of a DL signal from the target cell minus a second quality measurement of a DL signal from the source cell is above a second threshold value, for a second time period.

10. The wireless device of claim 9, wherein the second threshold value is higher than the first threshold value.

11. The wireless device of claim 8, wherein the message received is an RrcReconfiguration message.

12. The wireless device of claim 8, wherein the quality measurement of a DL signal is an RSRP measurement.

13. The wireless device of claim 8, wherein the one or more processors are further configured to measure the first quality measurement of a DL signal from the target cell and the first quality measurement of a DL signal from the source cell.

14. The wireless device of claim 8, wherein the one or more processors are further configured to determine the first difference.

15. The wireless device of claim 8, wherein the one or more processors are further configured to measure the second quality measurement of a DL signal from the target cell and the second quality measurement of a DL signal from the source cell.

16. The wireless device of claim 8, wherein the one or more processors are further configured to determine the second difference.

* * * * *